(12) United States Patent
Poplett et al.

(10) Patent No.: US 8,509,754 B2
(45) Date of Patent: Aug. 13, 2013

(54) DISTRIBUTING MOBILE-DEVICE APPLICATIONS

(75) Inventors: John Harlan Poplett, River Forest, IL (US); Michael Irizarry, Algonquin, IL (US); Narothum Saxena, Hoffman Estates, IL (US)

(73) Assignee: United States Cellular Corporation, Chicago, IL (US)

(*) Notice: Subject to any disclaimer, the term of this patent is extended or adjusted under 35 U.S.C. 154(b) by 1156 days.

(21) Appl. No.: 11/618,238

(22) Filed: Dec. 29, 2006

(65) Prior Publication Data

US 2008/0160983 A1 Jul. 3, 2008

(51) Int. Cl.
*H04M 3/00* (2006.01)
*H04M 3/22* (2006.01)
*G06F 9/44* (2006.01)
*G06F 9/455* (2006.01)

(52) U.S. Cl.
USPC ........... 455/418; 455/419; 717/168; 717/172; 717/173; 717/174; 717/178

(58) Field of Classification Search
USPC .......................... 455/418–420; 717/168–178
See application file for complete search history.

(56) References Cited

U.S. PATENT DOCUMENTS

| | | | |
|---|---|---|---|
| 5,887,254 A | 3/1999 | Halonen | |
| 6,073,318 A | 6/2000 | Phillips | |
| 6,075,470 A | 6/2000 | Little et al. | |
| 6,219,694 B1 | 4/2001 | Lazaridis et al. | |
| 6,271,605 B1 | 8/2001 | Carkner et al. | |
| 6,278,442 B1 | 8/2001 | Griffin et al. | |
| 6,701,521 B1* | 3/2004 | McLlroy et al. | 717/173 |
| 6,986,148 B2 | 1/2006 | Johnson, Jr. et al. | |
| 7,080,051 B1* | 7/2006 | Crawford | 705/400 |
| 7,373,495 B2* | 5/2008 | Clapper | 713/2 |
| 7,480,907 B1* | 1/2009 | Marolia et al. | 717/174 |
| 7,516,451 B2* | 4/2009 | Peng | 717/173 |
| 7,822,065 B2* | 10/2010 | Lu | 370/469 |
| 2001/0029178 A1* | 10/2001 | Criss et al. | 455/419 |
| 2003/0016237 A1* | 1/2003 | Hickey | 345/700 |
| 2003/0041125 A1* | 2/2003 | Salomon | 709/220 |
| 2004/0123281 A1* | 6/2004 | Olrik et al. | 717/168 |
| 2004/0237081 A1* | 11/2004 | Homiller | 717/170 |
| 2005/0010585 A1* | 1/2005 | Sahinoja et al. | 707/100 |
| 2005/0010914 A1* | 1/2005 | Liang et al. | 717/168 |
| 2005/0138138 A1* | 6/2005 | Jelinek et al. | 709/217 |
| 2005/0205278 A1* | 9/2005 | Maruyama et al. | 174/33 |
| 2005/0222933 A1* | 10/2005 | Wesby | 705/36 |
| 2006/0084381 A1* | 4/2006 | Hartwig | 455/41.2 |

(Continued)

*Primary Examiner* — Matthew Sams
(74) *Attorney, Agent, or Firm* — Leydig, Voit & Mayer, Ltd.

(57) ABSTRACT

The present invention provides an "update forwarder" function to facilitate downloading applications to mobile devices. The update forwarder receives updates on its "network side" from one or more device management servers, stores the updates, and then delivers them from its "device side" to one or more mobile devices. By using wired or short-haul wireless links on both its network and device sides, the update forwarder can reduce demand for the precious bandwidth of a widespread wireless network. The update forwarder can receive downloads during off-peak times for the device management servers and at times when the mobile device is turned off or otherwise unavailable. Downloads can be scheduled to be delivered only when the mobile device is not otherwise in use. The update forwarder can be implemented with little cost as one function running on a device, such as a home PC or local server, that already serves other functions.

23 Claims, 6 Drawing Sheets

(56) References Cited

U.S. PATENT DOCUMENTS

| | | |
|---|---|---|
| 2006/0190238 A1* | 8/2006 | Autor et al. .................... 703/25 |
| 2006/0217111 A1* | 9/2006 | Marolia et al. ................ 455/418 |
| 2006/0217113 A1* | 9/2006 | Rao et al. ................... 455/422.1 |
| 2007/0011446 A1* | 1/2007 | Kato et al. .................... 713/150 |
| 2007/0028120 A1* | 2/2007 | Wysocki et al. .............. 713/192 |
| 2007/0105589 A1* | 5/2007 | Lu ............................... 455/556.2 |
| 2009/0113413 A1* | 4/2009 | Reinz ............................ 717/173 |

* cited by examiner

FIG. 3

| Implementation of Update Forwarder 300 | Functions of Update Forwarder 302 | To Device Management Server 304 | To Mobile Device 306 |
|---|---|---|---|
| Back-to-Back Agent 308 | Control and Download | Emulate Mobile Device | Emulate Device Management Server |
| Distribution Agent 310 | Control and Download | Update Forwarder Protocol | Emulate Device Management Server |
| Download Agent 312 | Download | Update Forwarder Protocol | Emulate Device Management Server |

FIG. 6

DISTRIBUTING MOBILE-DEVICE APPLICATIONS

FIELD OF THE INVENTION

The present invention relates generally to wireless communications, and, more particularly, to distributing applications that run on wireless devices.

BACKGROUND OF THE INVENTION

Like most other computing devices, a mobile device requires that updates be downloaded to it for the applications running on it. (To make the present discussion easier, "applications" include all software and firmware components that run on the mobile device, including the operating system, any utilities, and databases, in addition to the software programs normally thought of as "applications.") Also, completely new applications can be downloaded to the mobile device at its user's discretion.

On first consideration, nothing could be more straightforward than downloading updates or downloading new applications to a mobile device. The download process can use the same wireless communications capability that the mobile device uses when running its applications. Intricacies of wireless communications such as, for example, locating the mobile device, authenticating the device to the network, and negotiating to use wireless bandwidth, must have already been worked out before the mobile device could function at all. In order to download an application to the mobile device, therefore, "device management servers" (devices that store updates and new applications and then deliver them to mobile devices) can simply use the existing wireless infrastructure and techniques. Indeed, this is exactly how updates and new applications have traditionally been distributed to mobile devices.

However, the very simplicity of this traditional download method presents problems. When updating is so simple, updates become common, and the bandwidth needed to download them begins to compete with the bandwidth needed by mobile devices to actually run applications. This leads to longer download times and possibly to reduced performance for the running applications. In addition, downloads may not even be possible at certain times because the mobile device enters an area of spotty or non-existent wireless network coverage (or is turned off). When compensating for this, the device management servers are sometimes overloaded as they try to update multiple mobile devices during the limited time when those devices are reachable over the wireless network.

BRIEF SUMMARY OF THE INVENTION

In view of the foregoing, the present invention provides an "update forwarder" function to facilitate downloading applications to mobile devices. The update forwarder receives updates on its "network side" from one or more device management servers, stores the updates, and then delivers them from its "device side" to one or more mobile devices. By using wired or short-haul wireless links on both its network and device sides, the update forwarder can reduce demand for the precious bandwidth of a widespread wireless network.

In some embodiments, on its network side the update forwarder receives updates from device management servers via a wired or optical link such as a private line or the Internet. Because this communication need not occur in synchrony with delivering the downloads to the mobile device, the update forwarder can receive the downloads during off-peak times for the device management servers and at times when the mobile device is turned off or otherwise unavailable.

When downloading updates to the mobile device, the update forwarder's device side can use a wired link, such as a USB cable when the mobile device sits in its charging cradle, or a short-haul wireless link, such as Wi-Fi. These downloads can be scheduled to be delivered only when the mobile device is not otherwise in use.

The update forwarder can be implemented with little cost as one function running on a device, such as a home PC, local server, or wireless home gateway, that already serves other functions. Because of the low cost, many update forwarders can be set up which would substantially decrease the load on the device management servers. In the limit, a tree structure exists wherein the device management servers only update the update forwarders, and the update forwarders update the mobile devices.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the present invention is illustrated as being implemented in a suitable environment. The following description is based on embodiments of the invention and should not be taken as limiting the invention with regard to alternative embodiments that are not explicitly described herein.

Figure 1:
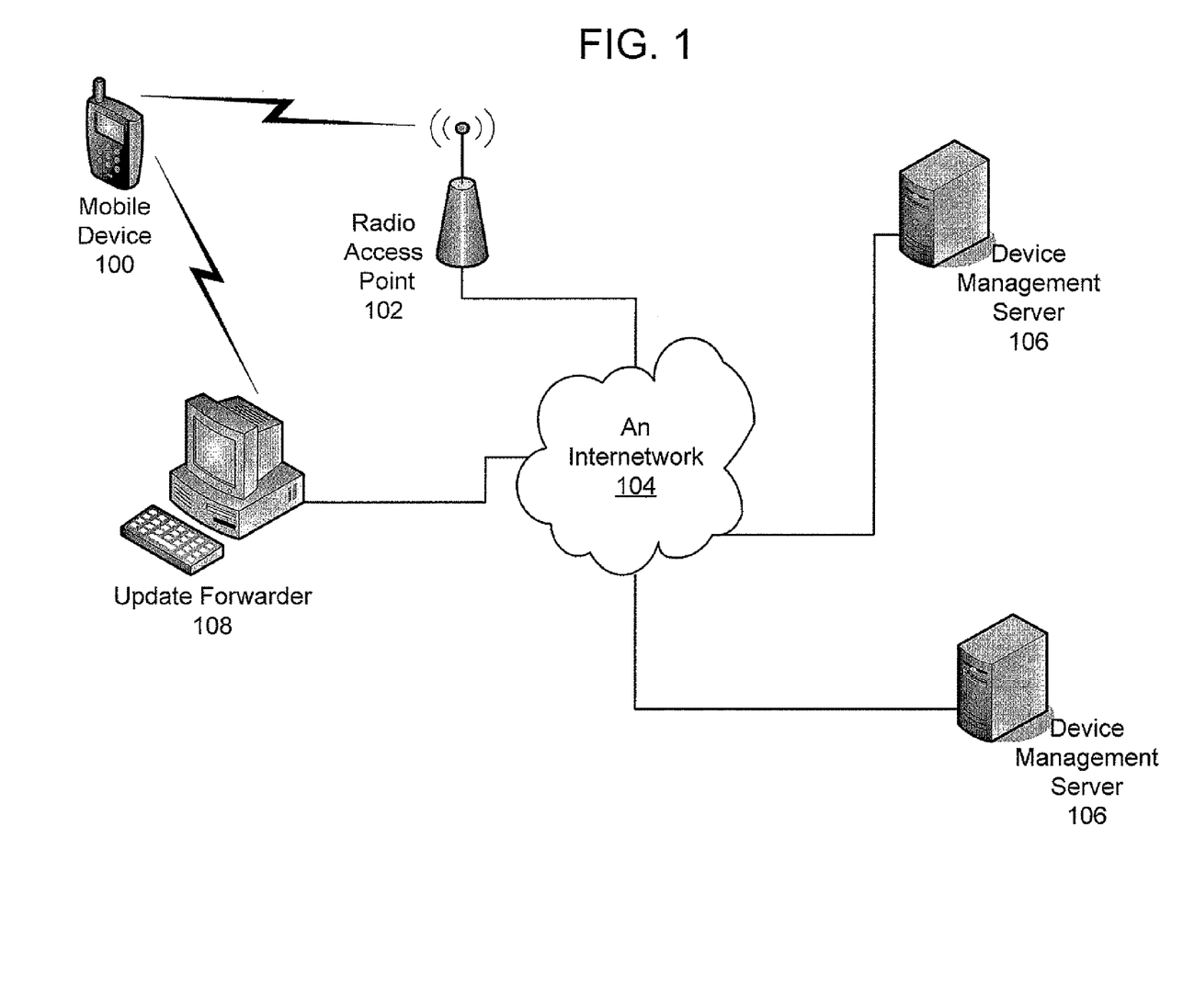
FIG. 1 is a network diagram showing a mobile device, a couple of device management servers, and an update forwarder.

FIG. 1 presents the devices in one embodiment of the present invention. A mobile device 100 communicates via wireless to a Radio Access Point 102. While shown in FIG. 1 as a cellular telephone, the mobile device 100 can be any wireless-equipped device such as, for example, a laptop computer or a personal digital assistant.

Through the Radio Access Point 102, the mobile device 100 can communicate with many other devices through an internetwork 104. The internetwork 104 can include other wireless links, wired links, the Public Switched Telephony Network, and the Internet. The other devices that the mobile device 100 communicates with include both mobile and nonmobile devices (not shown). The present invention is not limited by the nature of the devices with which the mobile device 100 communicates.

When software or firmware updates or new applications become available for the mobile device 100, a device management server 106 traditionally downloads the updates to the mobile device 100 via wireless through the Radio Access Point 102. As discussed above, this technique, though workable, is costly and often inconvenient.

The present invention provides an update forwarder 108. On its network side, the update forwarder 108 receives updates from one or more device management servers 106 and then delivers the updates through its device side to the mobile device 100. Instead of downloading over the rather costly wide-area wireless link (via the Radio Access Point 102), the update forwarder 108 can use a wired (e.g., cable, DSL, or internetwork 104) link to receive the updates from the device management servers 106. This download may be scheduled during off-peak times to reduce the load on the device management servers 106. At a convenient time, the update forwarder 108 delivers the updates to the mobile device 100 by using an inexpensive link, for example a short-haul wireless link (e.g., Wi-Fi) or a wired link to the charging cradle (not shown) of the mobile device 100.

No hardware need be dedicated to the update forwarder 108. The update forwarder 108 is a function that can run on a home PC, a departmental server, or a wireless home gateway that already serves some other function.

Figure 2:
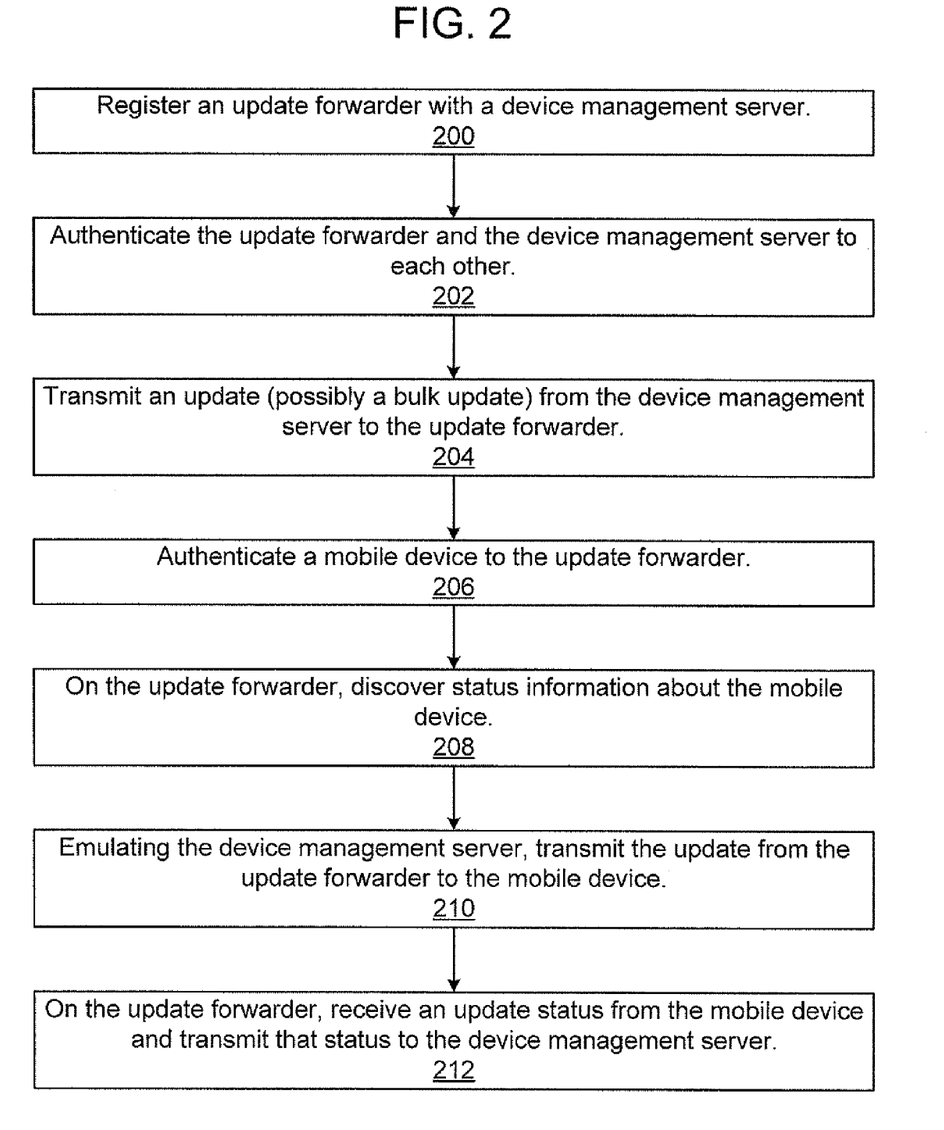
FIG. 2 is a flowchart of an exemplary method for using an update forwarder.

FIG. 2 presents a generalized overview of a procedure that can be used with an update forwarder 108. This overview is "generalized" because different embodiments implement different combinations of the steps of FIG. 2. This generalized discussion is followed by specific implementation examples discussed below with reference to FIGS. 3 through 6.

Particularly, the update forwarder 108 can include both control and download functions, but some implementations only support download, leaving all of the control to the device management servers 106. Control typically includes: initiating an update, authenticating the update forwarder 108 and the mobile device 100, discovering an appropriate update forwarder 108 to use, and delivering update status to the device management servers 106.

The network side of the update forwarder 108 communicates with the device management servers 106. In some implementations, the update forwarder 108 emulates a mobile device 100 to the device management servers 106, receiving updates and delivering status just as if it were a mobile device 100. In other implementations, the update forwarder 108 uses a special protocol when communicating with the device management servers 106. This protocol allows for a greater degree of control over the updating procedure.

As an example of the control made possible by a special protocol, step 200 of FIG. 2 shows an update forwarder 108 registering with one or more device management servers 106. For the sake of security and of update management, the device management servers 106 can be implemented so that they only deliver updates to registered update forwarders 108. Similarly, a mobile device 100 only receives updates from a registered update forwarder 108. During registration, a device management server 106 can tell the update forwarder 108 which mobile devices 100 it may update. This list is a subset of the list of all mobile devices 100 which the device management server 106 is assigned to update.

Before delivering an update to the update forwarder 108, the update forwarder 108 and the device management server 106 authenticate each other in step 202. Once authentication is complete, the device management server 106 delivers an update package to the update forwarder 108 in step 204. This package can include one update known to be needed by a particular mobile device 100. The package can also be a "bulk update" that includes multiple updates, some of which will go to one mobile device 100 and some to another. In this way, the device management server 106 can act as an update "wholesaler," while the update forwarder 108 acts as an update "retailer," paying attention to the particulars of delivery to individual mobile devices 100. This can greatly decrease the load on the device management server 106 because it only downloads a particular update once for each update forwarder 108 instead of once for each mobile device 100.

The update forwarder 108 is responsible for updating one or more mobile devices 100. In step 206, one of those mobile devices 100 is authenticated to the update forwarder 108. Then in step 208, the update forwarder 108 extracts current configuration and status information from the mobile device 100. This information can include:

an identifier of the mobile device 100;
a make and model of the mobile device 100;
firmware and software revision numbers for the mobile device 100;
a list of the applications already installed on the mobile device 100;
the amount of memory available on the mobile device 100; and
the type of the processor on the mobile device 100.

The update forwarder 108 uses this information to know which updates are appropriate for this particular mobile device 100. For example, the update forwarder 108 may have two or more versions of an update and will deliver the appropriate version based on the processor type and firmware revision number of each mobile device 100.

In step 210, the update forwarder 108 uses the information gathered above to deliver appropriate updates to the mobile device 100. In some embodiments, the mobile device 100 does not know that it is communicating with an update forwarder 108. Instead, the update forwarder 108 emulates a device management server 106 to the mobile device 100. Note that downloading updates to the mobile device 100 (step 210) need not occur in synchrony with downloading updates to the update forwarder 108 (step 204). Each of these steps is carried out when most convenient for the devices involved.

When the download is complete, the mobile device 100 in step 212 tells the update forwarder 108 of the results of the download, successful or otherwise. The mobile device 100 can also deliver updated information about itself (for example, the amount of memory available on the mobile device 100 may have changed as a result of the download). The update forwarder 108 delivers this information to the device management server 106. Steps 206 through 212 of FIG. 2 are repeated for each mobile device 100 to be updated by the update forwarder 108.

Figure 3:
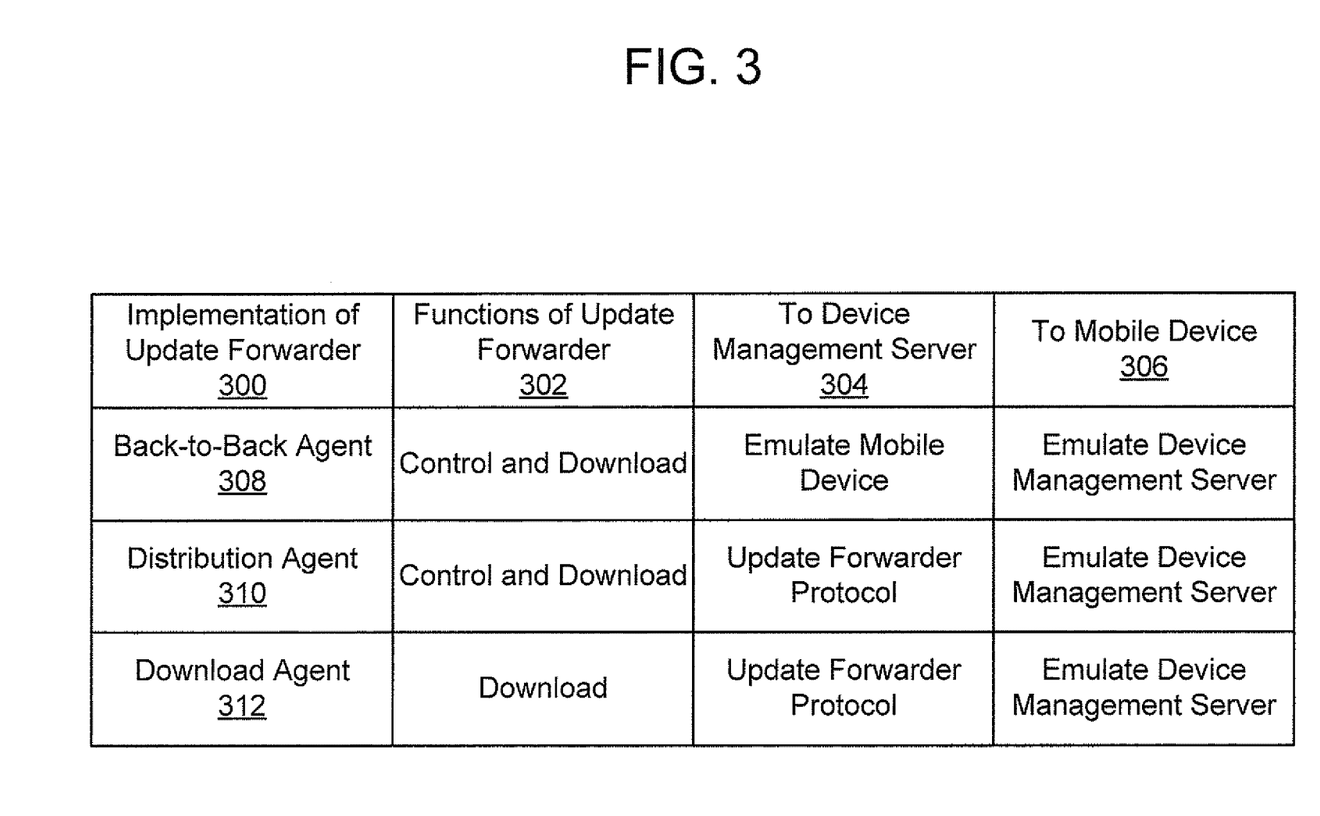
FIG. 3 is a table listing aspects of three implementations of the update forwarder.

The following discussion illustrates three particular implementations of the general procedures of FIG. 2. Column 300 of FIG. 3 gives a useful name to each of these three implementations. Column 302 tells whether a given implementation of the update forwarder 108 supports only the download function or also supports the control function. Columns 304 and 306 tell how the update forwarder 108 communicates with a device management server 106 and with a mobile device 100, respectively. Note that other implementations beyond the three of FIG. 3 are possible and are contemplated. These examples are not meant to limit the scope of the invention as claimed.

Figure 4:
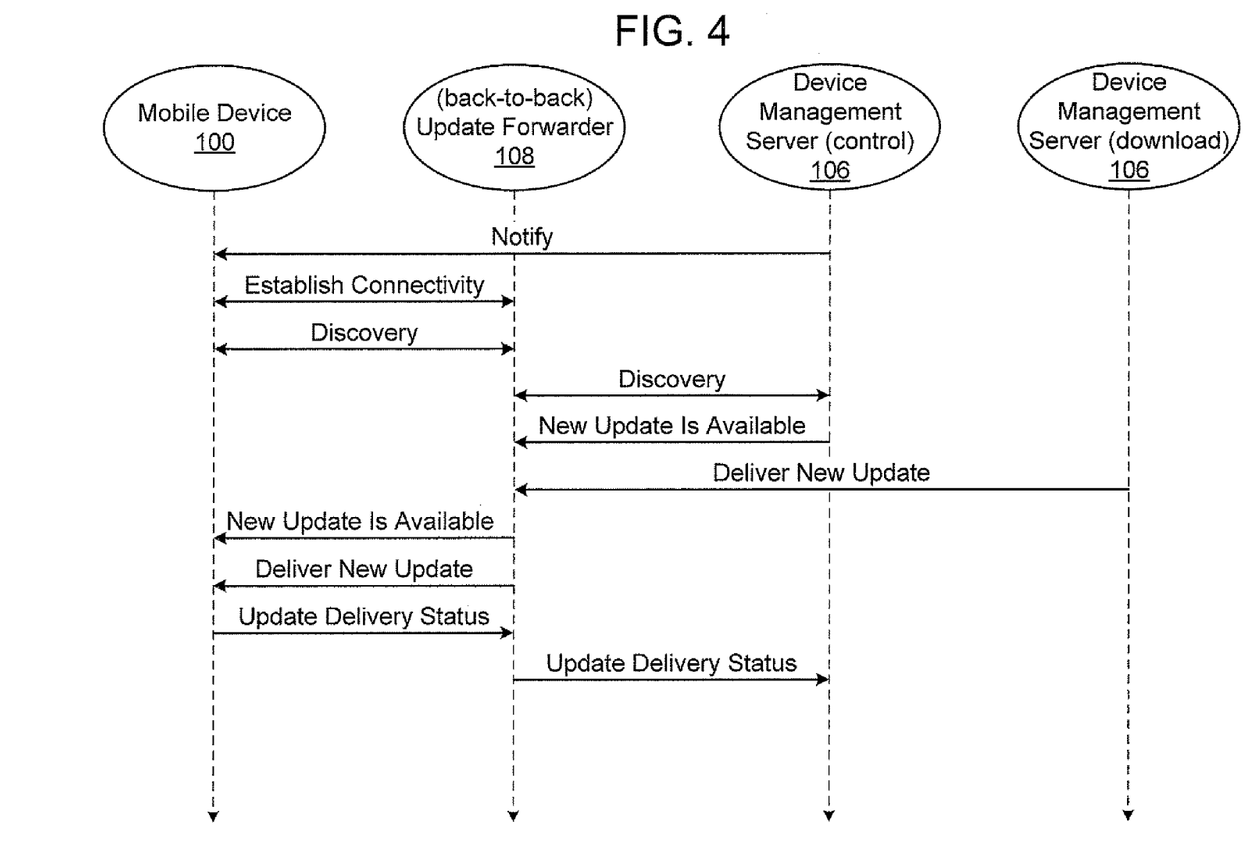
FIG. 4 is an information-flow diagram showing how a "back-to-back" implementation of the update forwarder can operate.

FIG. 4 illustrates a first embodiment of the update forwarder 108. This is the "back-to-back agent" of row 308 of FIG. 3. Towards a device management server 106, the back-to-back update forwarder 108 emulates an update protocol running on the mobile device 100 and downloads updates for the set of mobile devices 100 that it supports. To its mobile devices 100, the back-to-back update forwarder 108 emulates an update protocol running on the device management server 106 and delivers updates to the mobile devices 100.

To perform its control functions, the back-to-back update forwarder 108 stores, for each mobile device 100 that it supports, a configuration record that includes:

an identifier of the mobile device 100;

a make and model of the mobile device 100;

firmware and software revision numbers for the mobile device 100;

a list of the applications already installed on the mobile device 100;

a network address of a device management server 106;

authentication credentials specific to the mobile device 100; and authentication credentials specific to a device management server 106.

This information allows the update forwarder 108 to emulate the device management server 106 to the mobile device 100, including the authentication of step 206 of FIG. 2 and the discovery of status information of step 208.

The procedure of FIG. 4 can begin when the device management server 106 tells the mobile device 100 that updates are available for download. (This is optional.) When the mobile device 100 establishes connectivity with the back-to-back update forwarder 108, the establishment of connectivity triggers a discovery process between the mobile device 100 and the update forwarder 108. The update forwarder 108 learns the current status and configuration of the mobile device 100. In some embodiments, the update forwarder 108 responds differently to different types of connectivity. For example, the update forwarder 108 may choose to only initiate discovery when connectivity is established over a local link (such as a wired link to the charging cradle of the mobile device 100). The update forwarder 108 repeats the discovery process with the device management server 106.

When an update package becomes available, the device management server 106 notifies the back-to-back update forwarder 108 which then retrieves the package. If there is an update in the package that is appropriate for a mobile device 100, then the update forwarder 108 delivers that update to the mobile device 100. The update forwarder 108 receives the status of the download from the mobile device 100 and passes the status along to the device management server 106.

Figure 5:
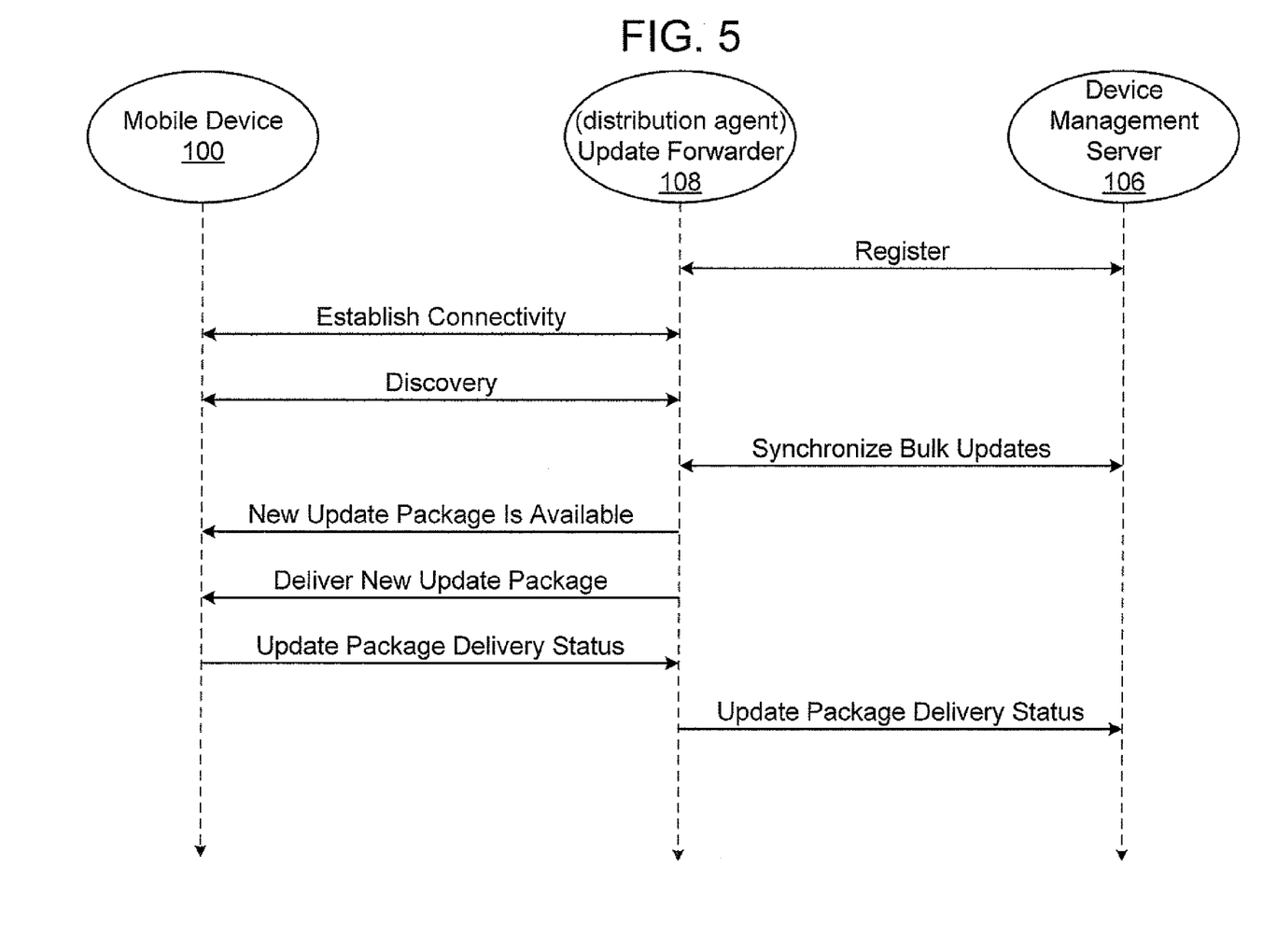
FIG. 5 is an information-flow diagram showing how a "distribution agent" implementation of the update forwarder can operate.

FIG. 5 shows a message flow for a "distribution agent" update forwarder 108 (row 310 of FIG. 3). As opposed to the back-to-back update forwarder 108 of FIG. 4, the distribution agent update forwarder 108 runs a distribution agent protocol with the device management server 106. By means of this protocol, the device management server 106 delegates some of its control functions to the update forwarder 108. In particular, the protocol allows:

the update forwarder 108 to register with the device management server 108;

bulk updates to be delivered to the update forwarder 108; and the bulk updates to be synchronized.

In particular, the distribution agent update forwarder 108 can receives bulk packages containing many updates and then deliver only the appropriate updates to each of the mobile devices 100 that it manages. As before, upon completion of an update, the status of the update is sent to the device management server 106.

Figure 6:
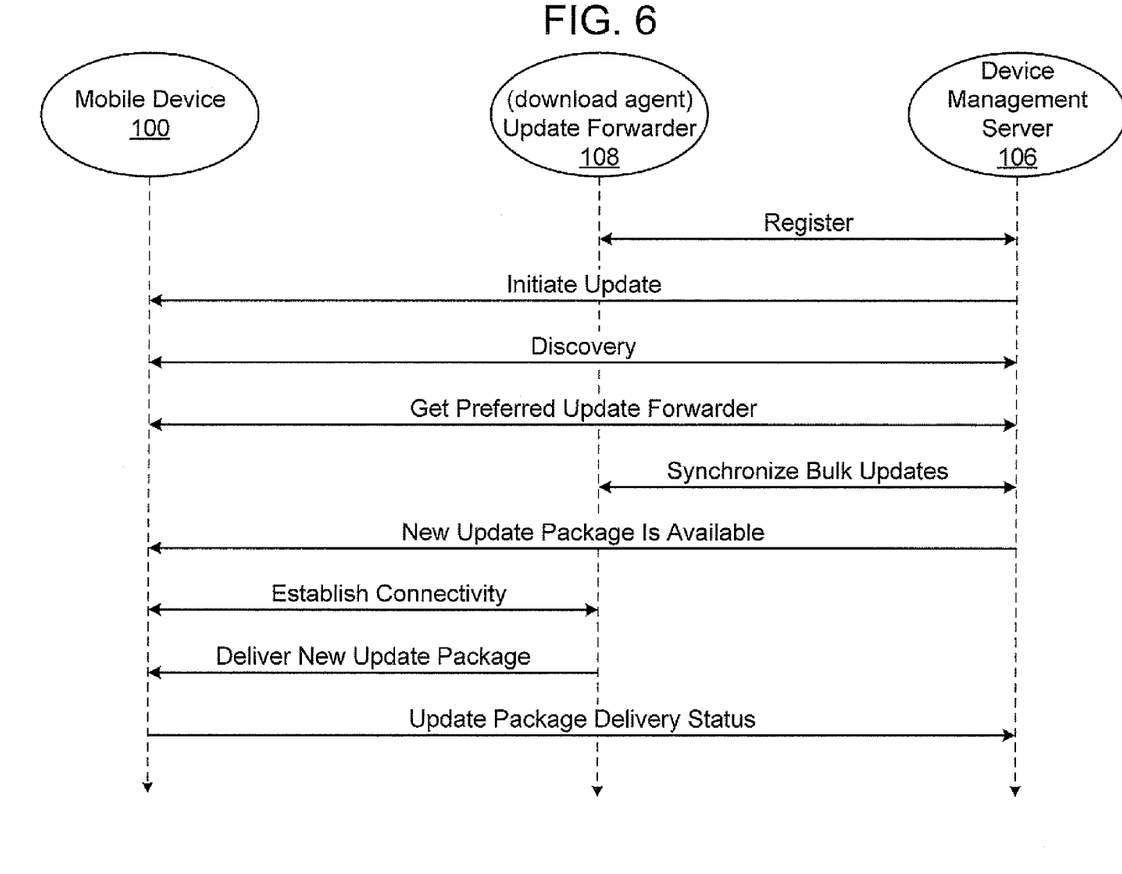
FIG. 6 is an information-flow diagram showing how a "download agent" implementation of the update forwarder can operate.

FIG. 6 shows message flows for a "download agent" update forwarder 108 (row 312 of FIG. 3). As with the distribution agent update forwarder 108, the download agent update forwarder 108 runs a special protocol with the device management server 106. This protocol allows the update forwarder 108 to register with the device management server 106, allows these devices to authenticate each other, and allows for bulk downloads to the update forwarder 108.

As shown in FIG. 6, the device management server 106 initiates the download process directly with the mobile device 100. Discovery takes place between the mobile device 100 and the device management server 106.

The device management server 106 can ask the mobile device 100 whether it prefers to work with any particular download agent update forwarder 108. If so, then the device management server 106 verifies whether the preferred update forwarder 105 is registered with it. The device management sever 106 directs the mobile device 100 to an update forwarder 108 to retrieve the update. The device management server 106 may override the mobile device 100's preference if, for example, the preferred update forwarder 108 is not registered with the device management server 106.

Through a synchronization process supported by the protocol between the chosen download agent update forwarder 108 and the device management server 106, the device management server 106 ensures that the update forwarder 108 has a copy of the needed update. The mobile device 100 then retrieves the update from the update forwarder 108. Upon completion, the mobile device 100 delivers its update status directly to the device management server 106.

Though it is not required, the present invention can be implemented using message exchanges defined by the Open Mobile Alliance Device Management ("OMA DM") Protocol. Notification is provided by the OMA DM notification protocol; discovery by the OMA DM discovery protocol, and the OMA DM Firmware Update Management Object protocol can provide the actual downloads and the status updates. Using an OMA DM "get" operation, a device management server 106 can retrieve the values of specific named parameters (called "nodes") from a mobile device 100.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details are determined by specific situations and by specific protocols used. Therefore, the invention as described herein contemplates all such embodiments as may come within the scope of the following claims and equivalents thereof.

We claim:

1. A method for providing an application update from a remote device management server to a mobile wireless device via an update forwarder, the method comprising:

receiving, by the update forwarder, the application update from the remote device management server, and wherein receiving the update comprises emulating the mobile wireless device to the device management server, the emulating comprising authenticating the update forwarder to the device management server as if the update forwarder were the mobile wireless device;

delivering, by the update forwarder, the application update to the mobile wireless device by emulating the remote device management server to the mobile wireless device, wherein during the delivering of the application update the update forwarder uses a device update protocol used by the remote device management server to provide application updates to mobile wireless devices, thereby enabling the mobile wireless device to receive the application update from the update forwarder in a same manner as receiving the application update directly from the remote device management server.

2. The method for providing an application update to a mobile wireless device of claim 1 wherein receiving the update comprises receiving the update over a wired connection.

3. The method for providing an application update to a mobile wireless device of claim 1 wherein transmitting the update comprises transmitting the update over a connection selected from the group consisting of: a Bluetooth connection, a USB connection, and a Wi-Fi connection.

4. The method for providing an application update to a mobile wireless device of claim 1 wherein transmitting the update comprises running a protocol selected from the group consisting of: an Open Mobile Alliance Device Management Protocol and an Open Mobile Alliance Download Protocol.

5. The method for providing an application update to a mobile wireless device of claim 1 further comprising:
performing a control function with the mobile wireless device, the control function selected from the group consisting of: discovering current information about the mobile wireless device and authenticating the mobile wireless device.

6. The method for providing an application update to a mobile wireless device of claim 1 further comprising:
receiving an update status from the mobile wireless device; and
transmitting the update status of the mobile wireless device to the device management server.

7. The method for providing an application update to a mobile wireless device of claim 1 further comprising:
registering the update forwarder with the device management server; and
authenticating the update forwarder and the device management server to each other.

8. The method for providing an application update to a mobile wireless device of claim 7 further comprising:
synchronizing with the device management server; and
receiving a bulk update from the device management server.

9. The method for providing an application update to a mobile wireless device of claim 1 further comprising:
storing on the update forwarder information about the mobile wireless device, the information selected from the group consisting of: an identifier of the mobile wireless device, a make of the mobile wireless device, a model of the mobile wireless device, a firmware revision level of the mobile wireless device, a software revision level of the mobile wireless device, a list of applications installed on the mobile wireless device, an amount of memory available on the mobile wireless device, a processor type of the mobile wireless device, and authentication credentials for the mobile wireless device.

10. A non-transitory computer-readable medium containing computer-executable instructions for providing an application update from a remote device management server to a mobile wireless device via an update forwarder, the computer-executable instructions facilitating performing the steps of:
receiving, by the update forwarder, the application update from the remote device management server, and wherein receiving the update comprises emulating the mobile wireless device to the device management server, the emulating comprising authenticating the update forwarder to the device management server as if the update forwarder were the mobile wireless device;
delivering, by the update forwarder, the application update to the mobile wireless device by emulating the remote device management server to the mobile wireless device, wherein during the delivering of the application update the updated forwarder uses a device update protocol used by the remote device management server to provide application updates to mobile wireless devices, thereby enabling the mobile wireless device to receive the application update from the update forwarder in a same manner as receiving the application update directly from the remote device management server.

11. A system for providing an application update to a mobile wireless device, the system comprising:
a remote device management server; and
an update forwarder comprising:
a network interface for receiving the application update transmitted from the remote device management server, and wherein the update forwarder is further configured for emulating the mobile wireless device to the device management server, and wherein during the emulating the update forwarder authenticates to the remote device management server as if the update forwarder were the mobile wireless device, and
a short-range communications interface for transmitting the application update to the mobile wireless device, and wherein the update forwarder is configured to deliver the application update to the mobile wireless device by emulating the remote device management server to the mobile wireless device, wherein during the delivering of the application update the update forwarder uses a device update protocol used by the remote device management server to provide application updates to mobile wireless devices, thereby enabling the mobile wireless device to receive the application update from the update forwarder in a same manner as receiving the application update directly from the remote device management server.

12. The system of claim 11 wherein the remote device management server is configured for forwarding the application update over a wired connection.

13. The system of claim 11 wherein the remote device management server is further configured for:
registering the update forwarder with the remote device management server; and
authenticating the update forwarder and the remote device management server to each other.

14. The system of claim 13 wherein the remote device management server is further configured for:
synchronizing with the update forwarder; and
transmitting a bulk update to the update forwarder.

15. The system of claim 13 wherein the remote device management server is further configured for directing the mobile wireless device to a registered update forwarder.

16. The system of claim 11 wherein the device management server is further configured for scheduling transmitting the application update to the update forwarder during an off-peak time.

17. The system of claim 11 wherein the a short-range communications interface is configured to support a connection selected from the group of connection types consisting of: a Bluetooth connection, a USB connection, and a Wi-Fi connection.

18. The system of claim 11 wherein the update forwarder is further configured for running a protocol selected from the group consisting of: an Open Mobile Alliance Device Management Protocol and an Open Mobile Alliance Download Protocol.

19. The system of claim 11 wherein the update forwarder is further configured for performing a control function with the mobile wireless device, the control function selected from the group consisting of: discovering current information about the mobile wireless device and authenticating the mobile wireless device.

20. The system of claim 11 wherein the update forwarder is further configured for:
receiving an update status from the mobile wireless device; and
transmitting the update status of the mobile wireless device to the remote device management server.

21. The system of claim 11 wherein the update forwarder is further configured for storing information about the mobile wireless device, the information selected from the group consisting of:
an identifier of the mobile wireless device,
a make of the mobile wireless device,
a model of the mobile wireless device,
a firmware revision level of the mobile wireless device,
a software revision level of the mobile wireless device,
a list of applications installed on the mobile wireless device,
an amount of memory available on the mobile wireless device,
a processor type of the mobile wireless device, and
authentication credentials for the mobile wireless device.

22. The system of claim 11 wherein the mobile wireless device is configured for indicating to the device management server a preferred update forwarder.

23. The system of claim 11 wherein the mobile wireless device is configured for initiating discovery with an update forwarder when connectivity is established with an update forwarder.

* * * * *